(12) United States Patent
Borden et al.

(10) Patent No.: US 8,752,687 B2
(45) Date of Patent: Jun. 17, 2014

(54) ELASTOMERIC SLIDE FOR A SOLIDS CONTROL SYSTEM

(75) Inventors: Kelly Borden, Alberta (CA); Trevor Fritz, Alberta (CA)

(73) Assignee: HiTEK Urethane Global Ltd., Nisku, Alberta (CA)

( * ) Notice: Subject to any disclaimer, the term of this patent is extended or adjusted under 35 U.S.C. 154(b) by 330 days.

(21) Appl. No.: 13/086,898

(22) Filed: Apr. 14, 2011

(65) Prior Publication Data

US 2012/0261229 A1    Oct. 18, 2012

(51) Int. Cl.
   *B65G 11/10*    (2006.01)
(52) U.S. Cl.
   USPC ..................... 193/25 R; 193/25 C; 193/25 A
(58) Field of Classification Search
   USPC ............. 193/4, 25 A, 25 C, 25 E, 25 R, 25 S
   See application file for complete search history.

(56) References Cited

U.S. PATENT DOCUMENTS

| 227,324 | A | * | 5/1880 | Tucker | 182/40 |
| 270,955 | A | * | 1/1883 | Key | 182/48 |
| 2,249,897 | A | * | 7/1941 | Hammill | 193/25 A |
| 4,081,075 | A | * | 3/1978 | Puretic | 198/812 |
| 5,472,768 | A | * | 12/1995 | Anson | 428/131 |
| 6,635,688 | B2 | * | 10/2003 | Simpson | 521/170 |
| 2011/0041954 | A1 | * | 2/2011 | Noonan | 141/316 |

FOREIGN PATENT DOCUMENTS

| CA | 1185546 | 4/1985 |
| CA | 2119108 | 1/2002 |

* cited by examiner

*Primary Examiner* — Leslie A Nicholson, III
(74) *Attorney, Agent, or Firm* — Bennett Jones LLP

(57) ABSTRACT

The invention is directed to a flexible, elastomeric slide having two major edges and two minor edges and mounting holes on the major edges for suspension underneath a solids control system. The major edges may be reinforced by rigid edge strips.

14 Claims, 6 Drawing Sheets

ELASTOMERIC SLIDE FOR A SOLIDS CONTROL SYSTEM

FIELD OF THE INVENTION

The present invention is directed to an elastomeric slide for use with a solids control system, particularly decanting centrifuges.

BACKGROUND OF THE INVENTION

Drilling fluids serve many functions during drilling, one of which is to remove excavated rock, or "drill cuttings," from the borehole. Solids such as clays, weighting agents, and other additives are incorporated continuously into the mud, with solids-control equipment employed at the rigsite to remove them and return the drilling fluid to the active system in a usable condition. Equipment, such as shakers and centrifuges, are used to remove larger particulate solids. However, as drilling fluids are used to drill multiple holes, fine particles can build up and ultimately create problems for efficient drilling.

Typically, the drilling fluid is diluted and reformulated to reduce the concentration of these fine solids and return the fluid to acceptable physical properties. However, this process is often costly and also increases the volume of drilling fluid, leading to problems of storage, transport, and disposal.

Environmental issues are posed due to contamination of the solids with hydrocarbons, and the need to reuse expensive solid additives. Decanting centrifuges have been developed to deliver high fluid recovery rates and efficient solids control. Centrifuges can recover as much as 95% of the barite in weighted drilling fluids. The barite is returned to the active mud system, while the decanting centrifuge discards the finer, lower-gravity solids.

Centrifuges typically reject solids onto a metal slide, which is usually a U-shaped trough with various struts and reinforcements to mount the trough to the underside of a centrifuge. However, these slides are relatively fragile and subject to rust and damage from normal operation. Further, solids rejected from the centrifuge may stick to the slide, with the need for frequent manual intervention.

SUMMARY OF THE INVENTION

The present invention is directed to an elastomeric slide. In one aspect, the invention comprises a flexible slide for suspension underneath a solids control system, the slide comprising a quadrilateral sheet of an elastomer having two major edges and two minor edges, wherein each major edge defines a plurality of mounting holes.

In one embodiment, each major edge is reinforced by a rigid edge strip.

In one embodiment, the elastomeric sheet comprises a polyurethane. In one embodiment, the sheet comprises a polyurethane having a hardness between about 90 and 100 on the Shore A durometer scale. In one embodiment, the slide comprises two edge strips on each major edge, sandwiching the polyurethane sheet. In one embodiment, at least one edge strip on each major edge comprises a polyurethane strip cast with the sheet so as to be bonded with the sheet. In one embodiment, at least one polyurethane edge strip has a hardness between about 70 and 80 on the Shore D durometer scale.

Additional aspects and advantages of the present invention will be apparent in view of the description, which follows. It should be understood, however, that the detailed description and the specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings, like elements are assigned like reference numerals. The drawings are not necessarily to scale, with the emphasis instead placed upon the principles of the present invention. Additionally, each of the embodiments depicted are but one of a number of possible arrangements utilizing the fundamental concepts of the present invention. The drawings are briefly described as follows.

DETAILED DESCRIPTION OF PREFERRED EMBODIMENTS

The present invention relates to an elastomeric slide for use with a solids control system, particularly decanting centrifuges. Any term or expression not expressly defined herein shall have its commonly accepted definition understood by those skilled in the art. To the extent that the following description is of a specific embodiment or a particular use of the invention, it is intended to be illustrative only, and not limiting of the claimed invention. The following description is intended to cover all alternatives, modifications and equivalents that are included in the spirit and scope of the invention, as defined in the appended claims.

Figure 1:
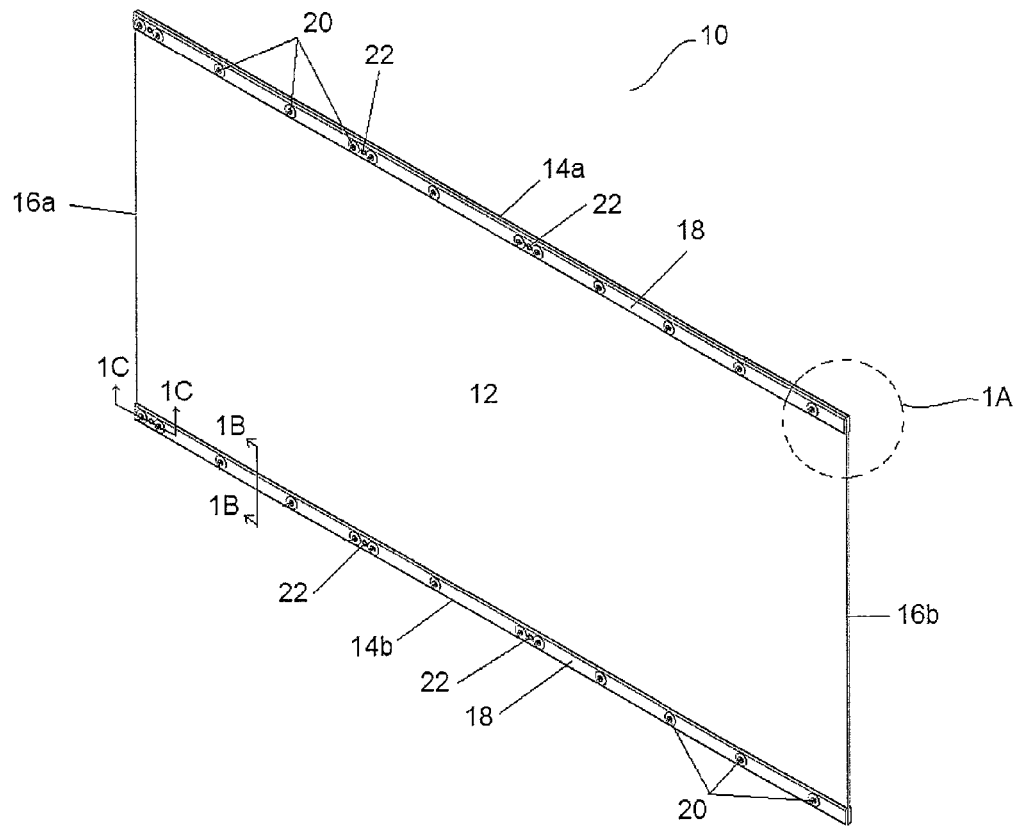
FIG. 1 is a schematic diagram showing one embodiment of a slide of the present invention.
Figure 1A:
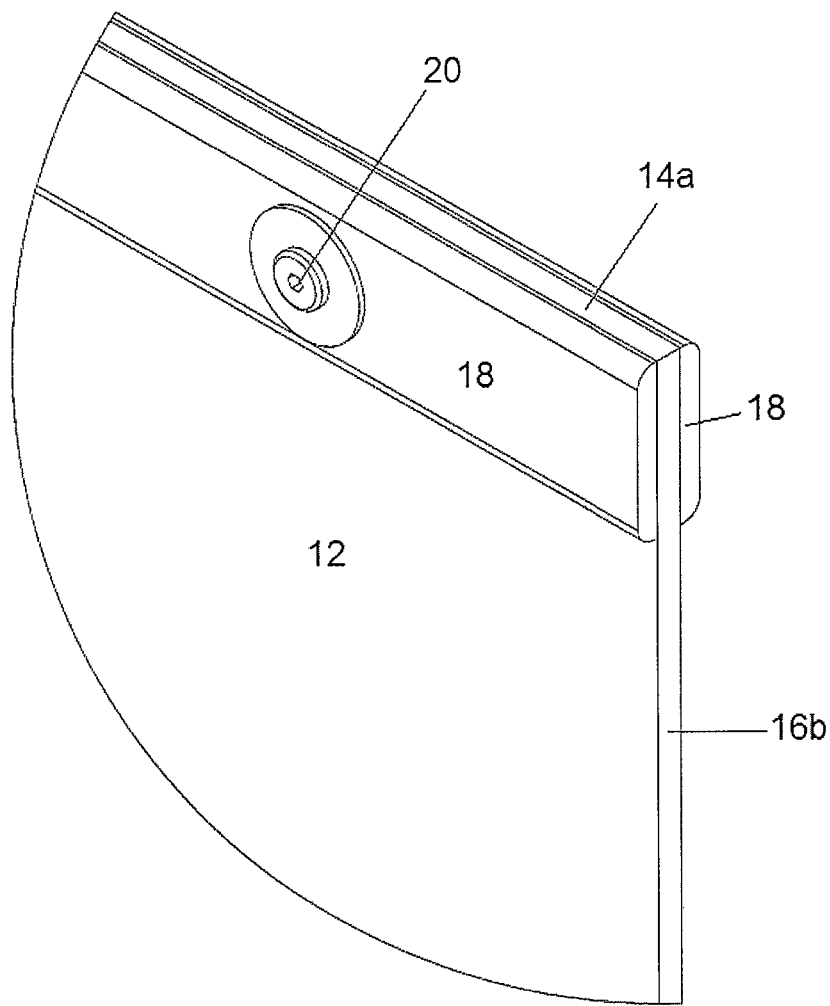
FIG. 1A is an enlarged view of a partially cut away section of the slide of FIG. 1, showing the detail of edge strips on a major edge of an elastomeric sheet.
Figure 1B:
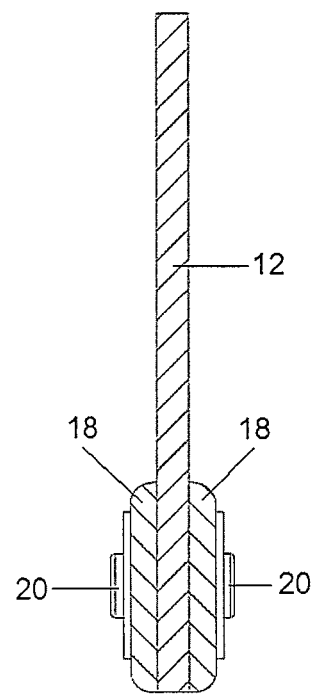
FIG. 1B is a cross-sectional view taken along line 1B-1B of FIG. 1, showing the detail of the edge strips sandwiching an elastomeric sheet.

The invention will now be described having regard to the accompanying Figures. FIG. 1 shows one embodiment of the slide (10) which comprises a quadrilateral sheet (12) of an elastomer having two major edges (14a, 14b) and two minor edges (16a, 16b). As used herein, the term "quadrilateral," when used in reference to the planar shape of a sheet (12), means having four sides. In one embodiment, the quadrilateral sheet (12) is rectangular. The shape of the sheet (12) is not limited to that of the present example, but may variously be changed, for example, into a square, parallelogram, or other polygonal shape, or the like.

As used herein, the term "elastomer" means a material which exhibits the property of elasticity, namely the ability to deform when a stress is applied and to recover its original form (i.e., length, volume, shape, etc.) when the stress is removed. Elastomers typically have a low Young's modulus (i.e., the ratio of tensile stress to tensile strain, expressed in units of pressure), and a high yield strain (i.e., the stress at which a material begins to deform plastically, expressed in units of pressure). Suitable elastomers for use in the present invention may include, for example, saturated and unsaturated rubber, and thermoplastic elastomers. Examples of thermoplastic elastomers include, but are not limited to, styrenic block copolymers, polyolefins, polyurethanes, polyesters and polyamides.

The elastomer selected for the slide (10) of the present invention need not be highly elastic. The elastomeric sheet (12) only needs to be sufficiently flexible to form a trough when suspended by its two major edges (14a, 14b). When laid flat, the elastomeric sheet (12) can be easily rolled up for storage or transport. In one embodiment, the elastomeric sheet (12) comprises a polyurethane of suitable hardness and flexibility. Polyurethane presents a smooth low friction surface which allows solids to slide on the surface easily. In one embodiment, the slide (10) comprises a polyurethane having a hardness between about 60 to about 100 on the Shore A durometer scale. Preferably, the polyurethane has a hardness of between about 80 and 100, and more preferably between about 90 and 100 on the Shore A scale.

In one embodiment, the major edges (14a, 14b) are reinforced with rigid edge strips (18). In one embodiment, the edge strips (18) may comprise a metal strip, a thermoset or thermoplastic plastic, or an elastomer. In one embodiment, polyurethane strips (18) which are harder than the sheet material may be used. For example, the edge strips (18) may comprise polyurethane strips having a hardness of about 75 on the Shore D scale.

Each major edge (14a, 14b) may comprise one or two edge strips (18). The edge strips (18) may be attached to the sheet (12) using adhesives, rivets, bolts or other known fasteners. In one embodiment, if both the sheet (12) and the edge strips (18) are polyurethane, the two may be cast together so as to be bonded together. As shown in FIGS. 1, 1A-C and 2, nuts and bolts (20) may be used to clamp the edge strips (18) to the sheet (12).

Figure 1C:
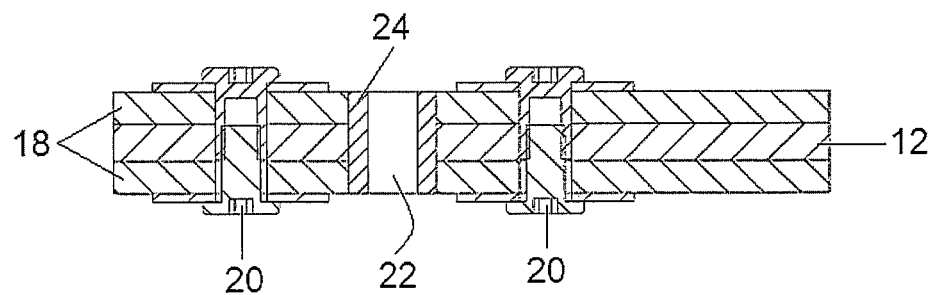
FIG. 1C is a cross-sectional view taken along line 1C-1C of FIG. 1, showing the detail of the edge strips, fastener and connector.
Figure 2:
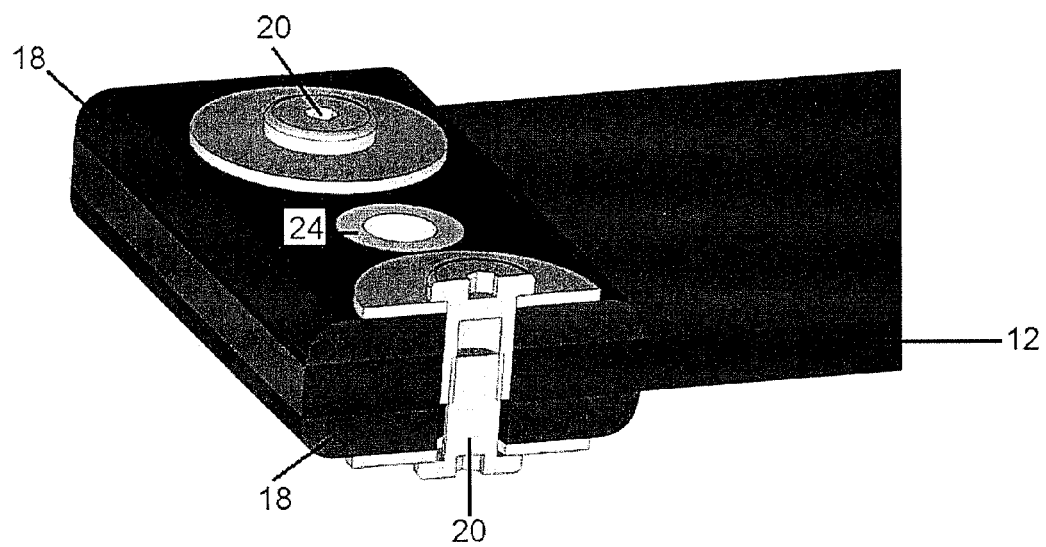
FIG. 2 is cross-sectional view of a portion of a slide of the present invention, showing the detail of the fastener.
Figure 3:
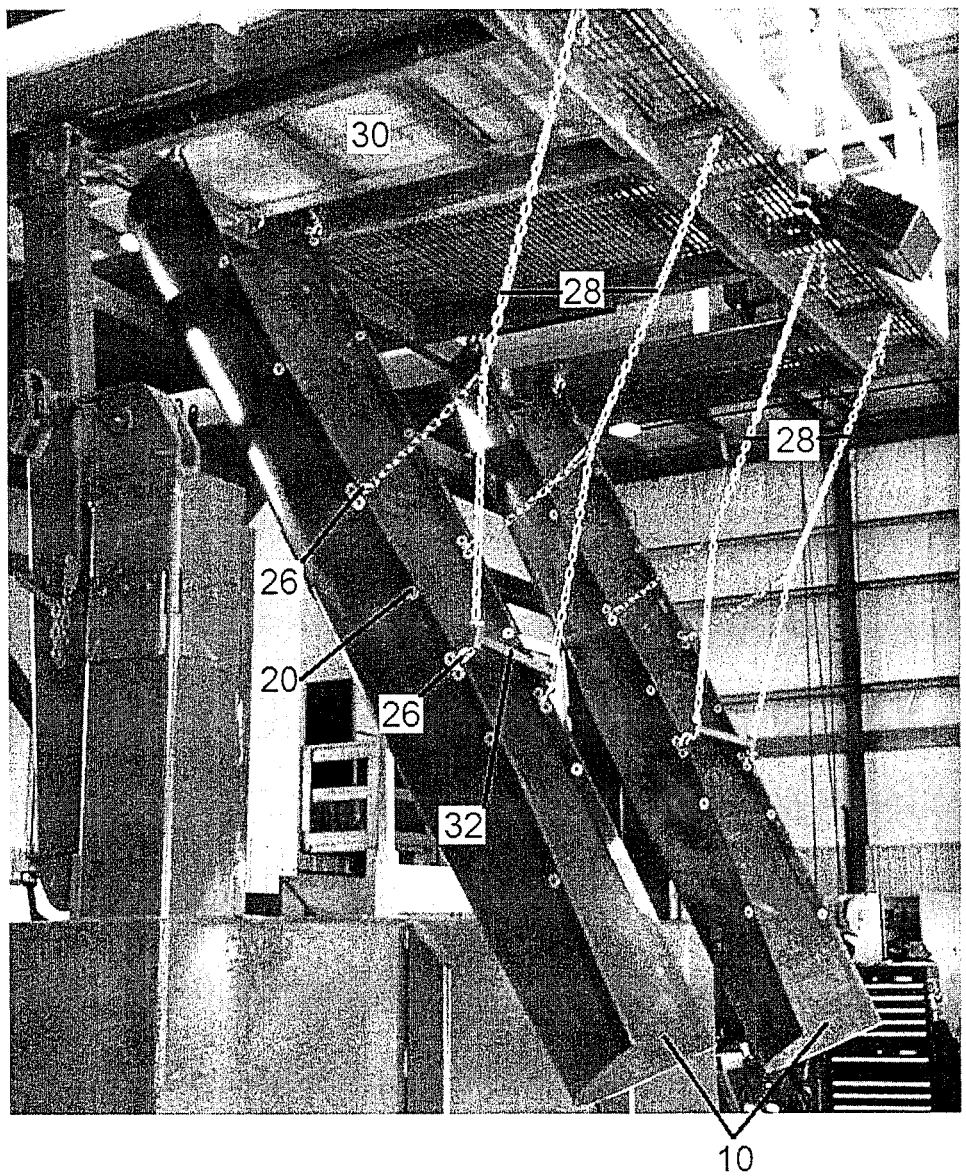
FIG. 3 is a photograph showing one embodiment of a slide of the present invention suspended underneath a solids control system.

As shown in FIGS. 1, 1C and 2, the major edges (14a, 14b) define a plurality of mounting holes (22), where connectors (24) may be installed to suspend the slide (10) using chains, cables, ropes, wires or slings. In one embodiment shown in FIG. 3, at least one lifting shackle (26) inserts into and is retained within a connector (24) on each major edge (14a, 14b). In one embodiment, the shackle (26) extends upwardly to enable the attachment or threading of a chain (28) to facilitate suspension of the slide (10) underneath a solids control system (30). In one embodiment, the shackle (26) extends upwardly to enable the attachment of a support member (32). The support member (32) is connected at each end to opposing shackles (26) and opposing chains (28) in an orientation that is substantially perpendicular to the major edges (14a, 14b) and substantially parallel to the minor edges (16a, 16b).

Figure 3A:
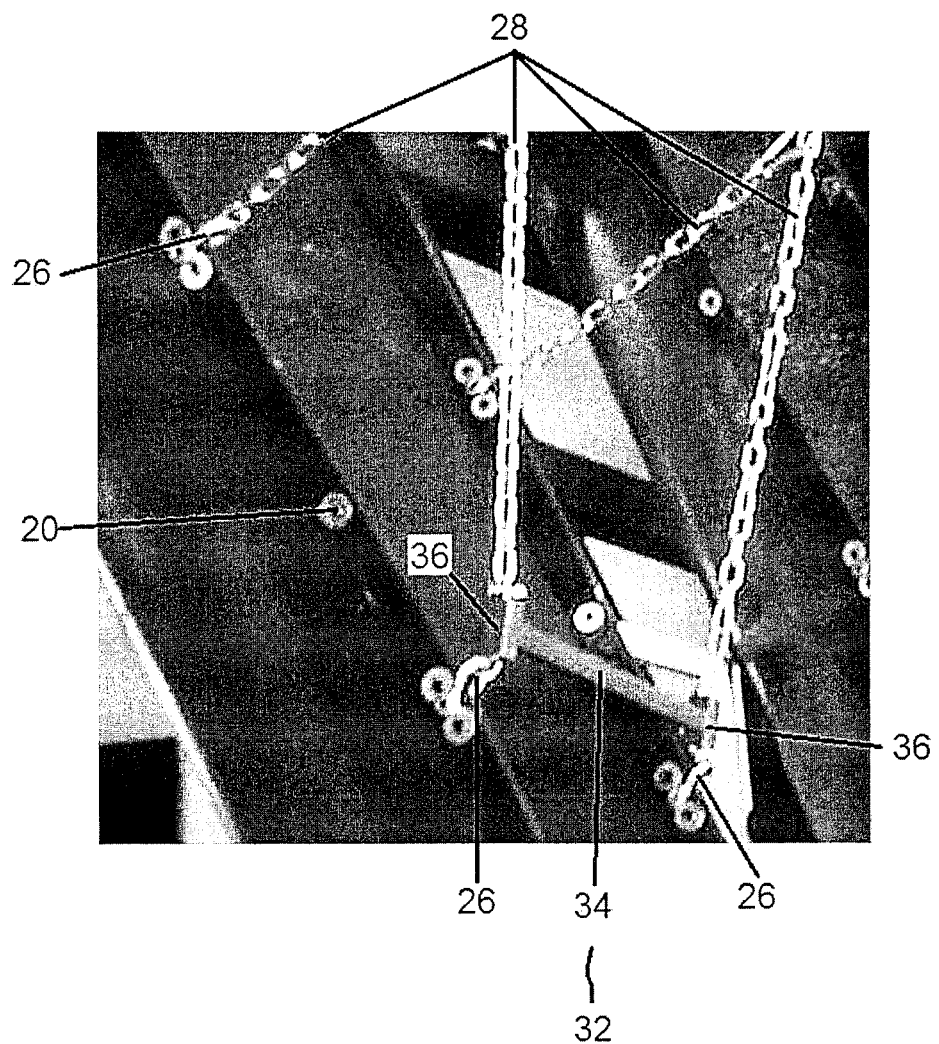
FIG. 3A is a photograph showing the detail of the shackle and support member of FIG. 3.

In one embodiment shown in FIG. 3A, the support member (32) comprises a stabilizing beam having a cross-member (34) and vertical flange portions (36) connected to opposite ends of the cross-member (34). The vertical flange portions (36) are connected to opposing shackles (26) and opposing chains (28). The beam is sized to accommodate the width of the trough when the elastomeric sheet (12) is suspended by its major edges (14a, 14b). In one embodiment, the length of the cross-member (34) is substantially identical to the width of the trough. The support member (32) helps to maintain the trough and stabilize the slide (10), minimizing swaying of the chains (28). The support member (32) may be constructed from any suitable material including, but not limited to, steel, plastic, or wood.

Since the slide (10) is not rigidly mounted, it can yield to significant contact without suffering any damage. Also, because the slide (10) itself is flexible, elastic and impervious to corrosion, it is far less susceptible to damage. It is easily transported as it may be laid flat or rolled up.

What is claimed is:

1. A method of forming a flexible slide underneath a solids control system, the method comprising the steps of:
   (a) providing a quadrilateral sheet of an elastomer having two major edges and two minor edges, wherein each major edge defines a plurality of mounting holes; and
   (b) flexibly suspending the sheet underneath the solids control system from the mounting holes of the two major edges to form a trough between the major edges, the trough inclined between the minor edges.

2. The method of claim 1 wherein each major edge is reinforced by a rigid edge strip.

3. The method of claim 1 wherein the elastomeric sheet comprises a polyurethane.

4. The method of claim 3 wherein the sheet comprises a polyurethane having a hardness between about 90 and 100 on the Shore A durometer scale.

5. The method of claim 4 wherein the slide comprises two edge strips on each major edge, sandwiching the polyurethane sheet.

6. The method of claim 5 wherein at least one edge strip on each major edge comprises a polyurethane strip cast with the sheet so as to be bonded with the sheet.

7. The method of claim 6 wherein the at least one polyurethane edge strip has a hardness between about 70 and 80 on the Shore D durometer scale.

8. A flexible slide for suspension underneath a solids control system, the slide comprising:
   a quadrilateral sheet of an elastomer having two major edges and two minor edges, wherein each major edge defines a plurality of mounting holes from which the sheet is flexibly suspended to form a trough therebetween, the trough inclined between the minor edges, wherein the minor edges are unsupported between the major edges;
   at least 2 suspension chains or ropes, each of the suspension chains or ropes connected to a different one of the two major edges of the sheet at at least one of the plurality of mounting holes; and
   a stabilizing beam having a first end which engages one of the suspension chains or ropes and a second end which engages the other suspension chain or rope.

9. The slide of claim 8 wherein each major edge is reinforced by a rigid edge strip.

10. The slide of claim 8 wherein the elastomeric sheet comprises a polyurethane.

11. The slide of claim 10 wherein the sheet comprises a polyurethane having a hardness between about 90 and 100 on the Shore A durometer scale.

12. The slide of claim 11 comprising two edge strips on each major edge, sandwiching the polyurethane sheet.

13. The slide of claim 12 wherein at least one edge strip on each major edge comprises a polyurethane strip cast with the sheet so as to be bonded with the sheet.

14. The slide of claim 13 wherein the at least one polyurethane edge strip has a hardness between about 70 and 80 on the Shore D durometer scale.

* * * * *